I. V. MACLEAN.
CONTINUOUS MOLDING APPARATUS.
APPLICATION FILED JAN. 26, 1911.
997,306.
Patented July 11, 1911.
3 SHEETS—SHEET 1.
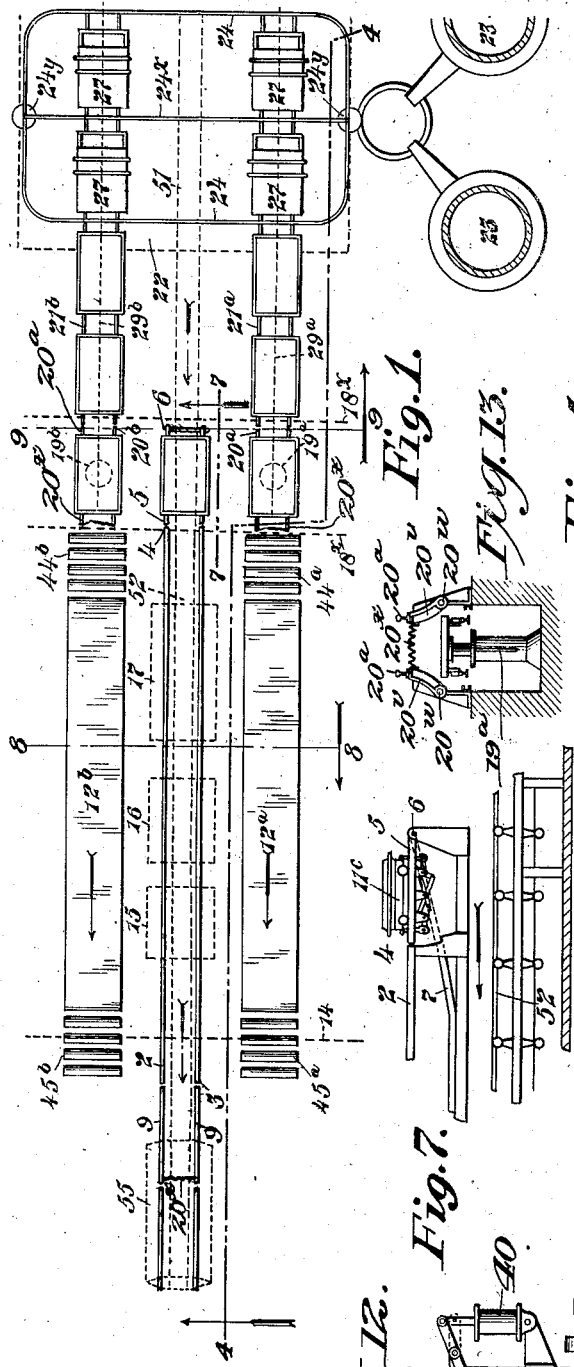
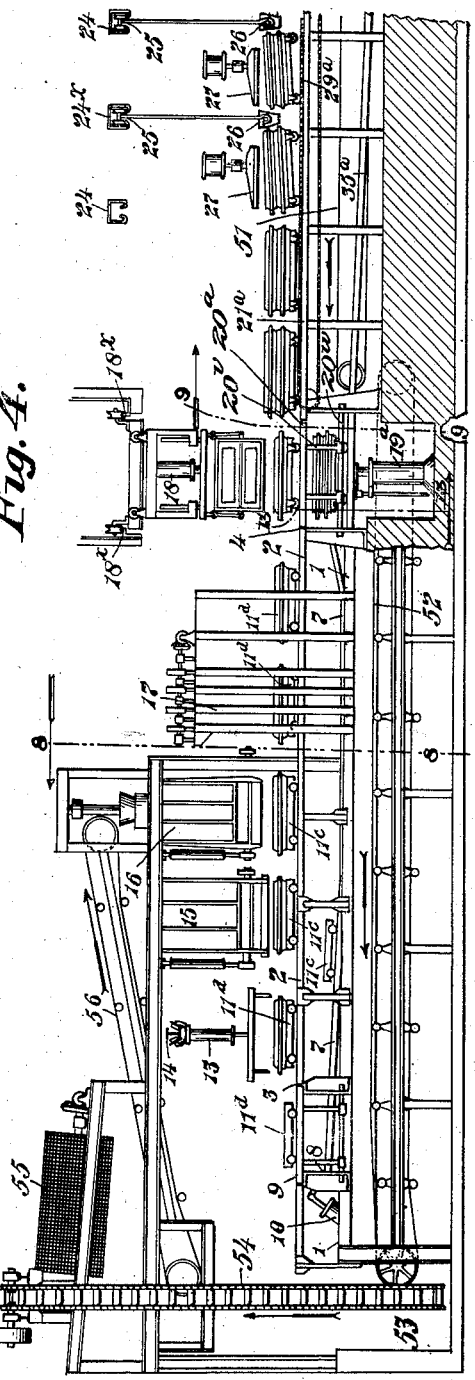
Witnesses
J. H. Bishop
Irene Lutz
Inventor
Ira V. Maclean.
Bond + Miller
Att'ys I. V. MACLEAN.
CONTINUOUS MOLDING APPARATUS.
APPLICATION FILED JAN. 26, 1911.
997,306.
Patented July 11, 1911.
3 SHEETS—SHEET 2.
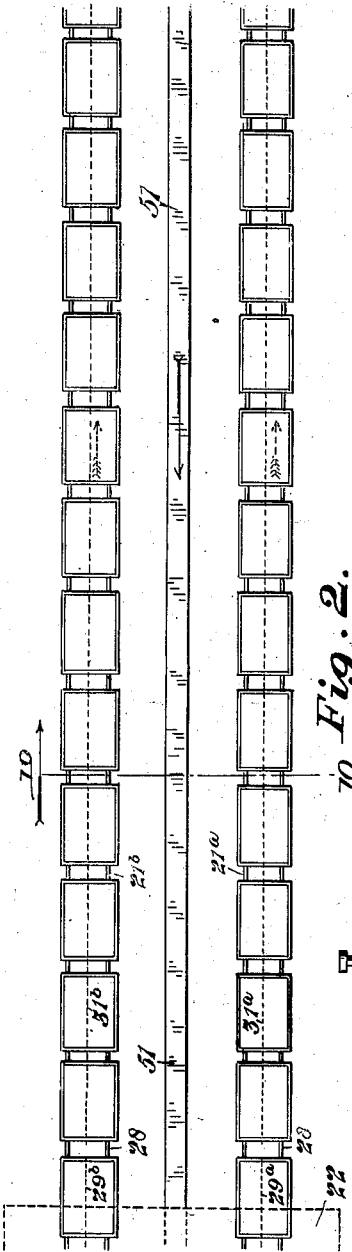
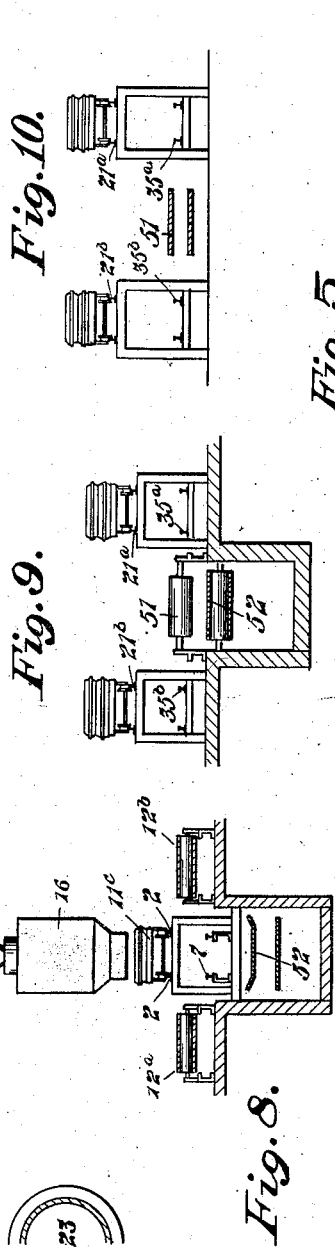
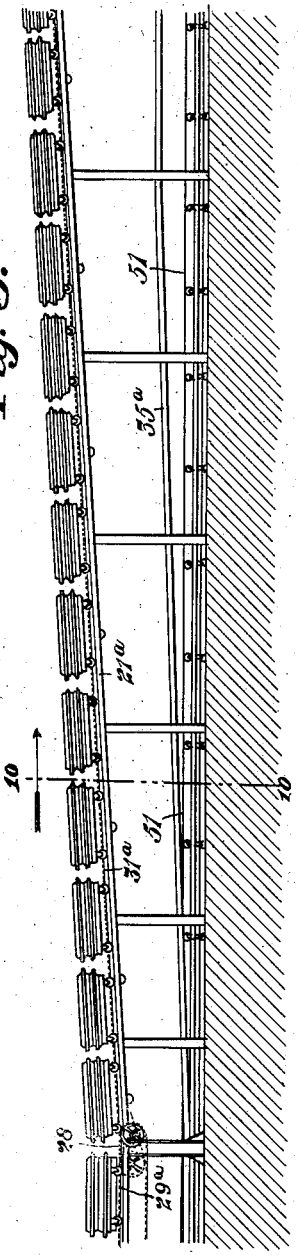
Witnesses
J. H. Bishop.
Irene Lutz
Inventor
Ira V. Maclean.
By
Bond & Miller
Attorneys

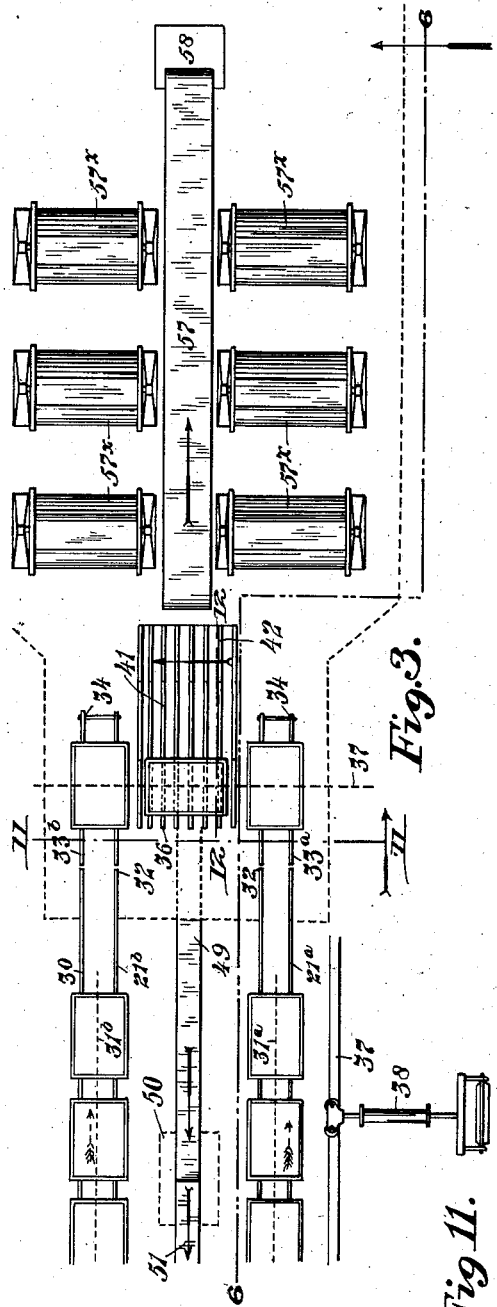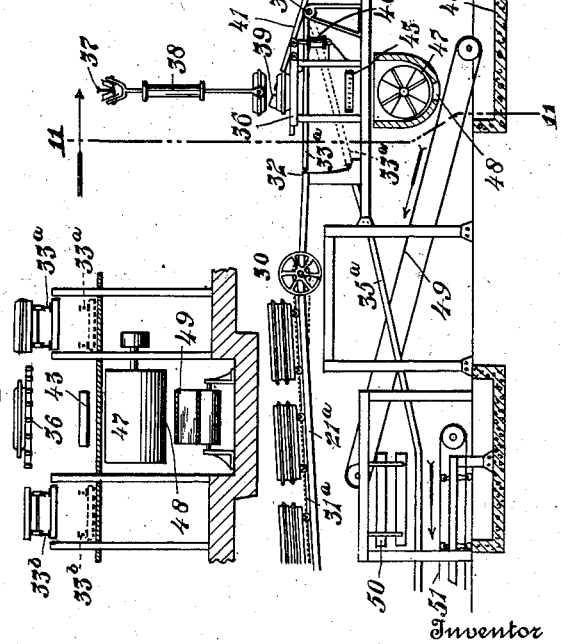

UNITED STATES PATENT OFFICE.

IRA V. MACLEAN, OF CANTON, OHIO, ASSIGNOR OF ONE-FIFTH TO WILLIAM C. LAIBLIN, OF CANTON, OHIO.

CONTINUOUS-MOLDING APPARATUS.

997,306. Specification of Letters Patent. Patented July 11, 1911.

Application filed January 26, 1911. Serial No. 604,894.

*To all whom it may concern:*

Be it known that I, IRA V. MACLEAN, a citizen of the United States, residing at Canton, in the county of Stark and State of Ohio, have invented a new and useful Continuous-Molding Apparatus, of which the following is a specification.

My invention relates to improvements in apparatus adapted for molding or casting metals and especially to a form of such apparatus wherein the operation of molding is continuous, the work requiring the attention of the minimum number of operators, the output being increased in quantity and the cost of production correspondingly lessened.

The advantages of machine molding where it is desired to produce a large number of duplicate castings of uniform quality in the most expeditious and economical manner are well known to those skilled in the art and need not be specially pointed out. In an apparatus for machine molding which is continuous in its operation the above mentioned advantages are greatly increased, as will be apparent.

Heretofore apparatus for machine molding adapted for continuous, or substantially continuous operation has been devised, but such apparatus has, in many cases, been expensive and complicated and of such a nature that occasional minor accidents in the preparation of the molds, the pouring of the metal, and the like have too greatly interrupted and interfered with the working of the entire device and correspondingly reduced the output. In addition to this defect such apparatus has in many cases been so constructed as to be subject to numerous accidents and breakdowns within itself, which renders many of the suggested forms of construction entirely unfit for practical use. Simplicity and durability in construction, low cost of construction, maintenance, operation and production, and assurance of practically continuous operation are prime requisites for a successful continuous molding apparatus.

The objects of my invention are to generally improve devices of the character mentioned, especially in the attainment of the prime requisites just named, and to so construct a continuous molding apparatus that the same can be used for various castings and various sizes of castings, change from the making of one style of castings to another being very readily and quickly made, at slight cost and without interrupting the operation of the device or reducing the output. These objects, together with other objects readily apparent to those skilled in the art, I attain by the construction illustrated in the accompanying drawings, although my invention may be embodied in other forms, the construction illustrated being chosen by way of example.

In the drawings Figure 1 is a plan view of the molding and pouring end of the apparatus. Fig. 2 is a plan view, being a continuation of Fig. 1 and showing the middle or cooling run-way portion of the device. Fig. 3 is a plan view, being a continuation of Fig. 2 and showing the shaking-out and cleaning end of the device. Fig. 4 is a side elevation of that portion of the apparatus shown in Fig. 1, said view being taken on the line 4—4 of Fig. 1 and showing some parts in section. Fig. 5 is a side elevation of that portion of the apparatus shown in Fig. 2. Fig. 6 is a side elevation of that portion of the apparatus shown in Fig. 3, said view being taken on the line 6—6 of Fig. 3, and showing some parts in section. Fig. 7 is a fragmentary view showing a side elevation of the pattern car drop at the end of the molding table, said view being taken on line 7—7 of Fig. 1. Fig. 8 is a transverse section on the line 8—8 of Figs. 1 and 4. Fig. 9 is a transverse section on the line 9—9 of Figs. 1 and 4. Fig. 10 is a transverse section on the line 10—10 of Figs. 2 and 5. Fig. 11 is a transverse section on the line 11—11 of Figs. 3 and 6. Fig. 12 is a fragmentary vertical section taken on the line 12—12 of Fig. 3. Fig. 13 is a vertical transverse section on the line 13—13 of Fig. 4.

Throughout the several views similar reference numerals indicate similar parts.

In general the apparatus herein disclosed may be said to consist of a longitudinally disposed molding section, where the molds are prepared and which section has connection at the end thereof with two longitudinally disposed parallel tracks leading first through the pouring section, thence for a considerable length along the cooling runways or cooling section, and ultimately to the shaking-out and cleaning section, the various sections being arranged in longitudinal series as mentioned, and being preferably arranged in a straight line. For clearness of description that end of the apparatus where the molds are prepared will be mentioned as the rear end, while that end where the molds are shaken out will be mentioned as the front end. A further statement of the general characteristics of my apparatus should include mention of the fact that in the device the pattern cars travel over a single vertically disposed pattern car loop, the upper side of which passes longitudinally over the molding table, at the front end of which the said loop meets the rear ends of two vertically disposed run-way loops arranged parallel with each other and on which bottom-board cars travel. The flasks however travel through a more extended vertical loop than either of those mentioned. They travel outwardly toward the front end of the device on the bottom-board cars, returning on the under side of the bottom-board run-way loops to the rear ends of said run-ways, whence the flasks themselves pass onward to the rear end of the molding table, are placed upon said pattern cars, and are carried forwardly along said molding table, thus causing said flasks to complete loops which are of a length equal to the combined length of the pattern car and bottom-board car loops.

In the present specification unnecessary description of details where no claim of invention is made by the applicant will be avoided, as it is believed that more general mention of those parts of the apparatus well known and readily understood by those skilled in the art is desirable.

More specifically describing the apparatus illustrated in the drawings, the numeral 1 indicates the general floor level above which, at the rear end of the apparatus, is suitably supported the molding table track proper 2. This track extends from the point 3 to the point 4. Beyond the point 4 is a short continuation of the track 2 upon the pattern car drop 5. This drop comprises means for holding the short length of track thereon in the position illustrated in Fig. 7 where it is continuous with the track 2, said means however being so constructed as to permit the drop to swing upon the pivotal point 6 so as to bring the track on said drop into the inclined position shown in dotted lines in said Fig. 7 which will bring the rear end of the track of said drop into alinement with the lower pattern car return track 7 which runs parallel with the track 2 and under the same back to the rear end of the device at 8.

Extending rearwardly from the end 3 of the track 2 are the rails 9, said rails are adapted to move laterally from each other so as to widen the space between said rails, as will hereinafter more fully appear and a suitable lift operated by the air cylinder 10 or equivalent means is arranged to pick up a pattern car from the rear end of the track 7, raise it vertically while the rails 9 are in their spread position, and lower said car upon the rails 9 after they have been brought back to their normal relative position in alinement with the rails of the track 2. It will thus be understood that a pattern car, having been so raised and arranged upon the rails 9 may move forwardly along the rails 2 to the drop 5 where it is lowered to the track 7, runs backwardly by reason of the downward inclination of said track 7 to the point 8, whence it may be raised by the car lift just described, each pattern car in its movements thus completing a vertically disposed pattern car loop.

The pattern cars shown in the drawings are indicated by the reference characters $11^c$ and $11^d$, those cars numbered $11^c$ bearing the patterns for copes and those cars numbered $11^d$ bearing the patterns for the drags. The details of construction of said pattern cars are immaterial, said cars being however preferably provided with wheels adapted to run along the rails of the pattern car loop and the patterns being detachably fastened to the said cars in such way that when it is desired to change the style of castings produced by the apparatus the old patterns may be removed from said pattern cars and new patterns fastened in their places. As shown in the drawings it is preferable to arrange the pattern cars on the pattern car loop so that there may be two drag pattern cars followed by two cope pattern cars, in turn followed by two drag pattern cars, etc., the drag and cope pattern cars being arranged in pairs of two and the pairs alternating. The purpose of this arrangement will hereafter more fully appear.

The molding table track proper is arranged in what may be termed the longitudinal median line of the apparatus and on both sides of said track are arranged the flask return belts $12^a$ and $12^b$ which constitute continuously moving carriers adapted to transport empty flasks from the returned bottom-board cars at the front end of the molding section of the apparatus to the rear end thereof, where the copes and drags of said flasks are separately raised from said return belts and arranged upon the pattern cars. For the purpose of raising said parts of said flasks and placing them upon said pattern cars the air lift 13 or its equivalent is provided, which air lift is adapted to travel upon a transversely arranged overhead track 14 extending entirely across the belts $12^a$ and $12^b$ so that said lift may be brought to a position over either belt for the purpose of lifting the cope or drag therefrom as the case may be and carrying said part to the molding table where it may be deposited upon a waiting pattern car. In Fig. 4 it will be noted that a pattern car without cope or drag thereon is upon the rails 9, while immediately to the front of said rails stands a pattern car 11ᵈ bearing a drag, the same having been deposited thereon by the said lift 13. From this position the car may be moved forwardly into position immediately under the facing sand hopper 15 from which hopper is received a sufficient quantity of facing sand. After receiving the appropriate quantity of facing sand the car is moved into position under the molding sand hopper 16 where the molding sand is deposited in the said drag. From this position the car is then moved into position for the operation of ramming which is performed by a set of mechanical rammers 17. Passing thence the car moves onto the pattern car drop 5 where the air lift 18 or its equivalent, adapted to travel transversely upon the track 18ˣ lifts the drag, the same being rolled over while it is suspended in the air, and carries the same outwardly and deposits it upon a waiting bottom board car upon one or other of the bottom-board car tracks, as will be hereinafter more fully described. The pattern cars may be moved along the track 2 by hand, but the preferable construction is that in which mechanical means is provided for moving said cars along said track, under the hoppers 15 and 16, said means being however preferably manually controlled, and a continuously moving mechanical means is provided for moving said cars under the rammers and out beyond said rammers substantially to the point 4, where said cars may be moved onto the pattern car drop 5 either manually or by mechanical means as may be desired. The construction of such mechanical means, whether manually controlled or continuously moving, is not herein claimed and for this reason no further detailed description thereof is deemed necessary. When the pattern car on the drop 5 has been relieved of the cope or drag as the case may be, said drop is manually tripped so as to cause it to pivotally move to allow the car to descend by gravity onto the track 7 and return to the point 8, whence it is lifted and placed upon the rails 9 as hereinbefore described. The drop 5 is immediately returned to the horizontal position shown in full lines in Fig. 7 ready to receive the next pattern car from the track 2.

On both sides of the drop 5 are arranged the bottom-board car lifts 19ᵃ and 19ᵇ. Said lifts are provided with means adapted to engage a returned bottom-board car after the empty flask has been stripped from the same, as hereinafter described, and raise said car vertically to the height of the track 21ᵃ or 21ᵇ of the bottom-board car loops.

Above the lifts 19ᵃ and 19ᵇ are short sections of track 20ᵃ and 20ᵇ respectively, the rails of which tracks normally register with the ends of the rails of the tracks 21ᵃ and 21ᵇ. The rails of the said tracks 20ᵃ and 20ᵇ, however, are adapted to move laterally from each other so as to widen the space between said rails sufficiently to allow a bottom-board car to be raised between the same, the said rails being adapted to swing together again when said bottom-board car has passed between them so that they will again register with the rails 21ᵃ or 21ᵇ, whereupon the wheels of the bottom-board car may engage the rails of the tracks 20ᵃ and 20ᵇ and move therefrom onto the track 21ᵃ or 21ᵇ after the bottom-board car has received its drag and cope.

In Fig. 13 is more fully shown the construction permitting the rails of the track 20ᵃ to separate or move laterally from each other. It will be noted by an inspection of said Fig. 13 that the said rails which constitute a short independent section of track are mounted upon the upper ends of the rail supporting arms 20ᵛ which are pivoted at their lower ends at 20ʷ to a stationary support. The coiled spring 20ˣ, lying below the plane of the rails 20ᵃ and to one end of the device is adapted to hold the upper ends of the arms 20ᵛ, with the rails thereon mounted, in the inner position illustrated in Fig. 13. The inner sides of the arms 20ᵛ extend upwardly and inwardly and when a bottom-board car is lifted by the lift 19ᵃ the car will engage the inwardly inclined edges of the said arms 20ᵛ, and as the car is lifted farther upwardly the said arms 20ᵛ will pivotally move outwardly to permit the car to pass between the upper ends of said arms and the rails mounted thereon. When said car has been lifted upwardly beyond the said arms 20ᵛ and rails thereon the spring 20ˣ will act to draw the upper ends of the arms together, thus bringing the rails thereon back to the normal position and to register with the rails of the track 21ᵃ. The bottom-board car may then be lowered, whereupon its wheels will be placed upon the rails of the track 20ᵃ, thus holding the car at the upper level while permitting the movable portion of the lift 19ᵃ to return to its lower position to receive the next bottom-board car to be lifted. The rails 9 hereinbefore mentioned are similarly mounted and supported as are also the rails of the track 20ᵇ. The details of construction of this part of the device are not herein specifically claimed and further description will therefore be unnecessary, as the exact arrangement of these parts is a matter of mechanical refinement.

The tracks 21ᵃ and 21ᵇ extend in parallelism from the said lifts 19ᵃ and 19ᵇ over the pouring table and up the inclined cooling run-way, shown more generally in Figs. 2 and 5, to the shake-out or extreme front end of the bottom-board car loops.

The pouring platform 22 is indicated in Fig. 1 by a dotted line showing the outline of the same, said platform being raised slightly above the general floor level 1 to place the workmen in a better position to pour the molten metal. To the side of the pouring platform are arranged suitable furnaces or cupolas 23 for supplying molten metal. An over-head ladle track 24 is arranged in the form of a loop with a cross-track 24$^x$ and suitable turn tables 24$^y$ to permit convenient access to the four molds which the pouring platform is adapted to accommodate at one time. Suitable wheeled carriers 25 are mounted upon the said overhead track and are provided with means for supporting the pouring ladles 26. Suitably mounted and arranged with reference to the location of the molds when in position for pouring are four pneumatically operated top plates 27 which, as well known to those skilled in the art, are used for the purpose of holding down and in place the parts of the molds during the operation of pouring. The tracks 21$^a$ and 21$^b$ from the lifts 19$^a$ and 19$^b$ to the point 28 are substantially horizontal. It should be noted however that the bottom-board cars should be held with one end elevated during the process of pouring, as shown in Fig. 4. This may be accomplished in any well known convenient manner.

Mechanical means, illustrated in the drawings as endless chains 29$^a$ and 29$^b$, are adapted for automatically intermittently moving the cars upon the tracks 21$^a$ and 21$^b$ from the lifts 19$^a$ and 19$^b$ under the top plates 27 and out to the point 28 where the tracks 21$^a$ and 21$^b$ begin their inclination. The details of construction of such means is not claimed herein and it is thought unnecessary to more fully describe it but it should be so arranged and so inter-related with the top plates 27 that the said means and said top plates on both of the tracks 21$^a$ and 21$^b$ are operated simultaneously, said operation being intermittent. The means should operate to bring the cars, two on each track at one time, under the top plates, whereupon the top plates should automatically and immediately move downwardly into clamped position, when the molds on the four cars then on the platform should be poured, whereupon the intermittent moving means will again start, releasing the top plates from the molds, lifting said top plates, and moving the four poured molds upon their respective bottom-board cars forwardly toward the inclined run-way, at the same time bringing two new molds on each track into position under the top plates, when the operation just described may be repeated. From the point 28 up the inclined tracks 21$^a$ and 21$^b$ to the point 30 the bottom-board cars with the poured molds thereon are steadily and slowly moved by continuously moving chains 31$^a$ and 31$^b$ or their equivalents. The means for moving the bottom-board cars over the pouring platform and for alternately operating the top plates 27 is controlled and operated by the said chains 31$^a$ and 31$^b$.

While moving up the inclines the metal in the molds cools so that by the time the bottom-board cars reach the point 30 the castings are in fit condition to be shaken out. From the point 30 the tracks 21$^a$ and 21$^b$ extend farther forwardly and are declined for a short distance to the points 32, where they terminate, the rails however at those points registering with the rails 33$^a$ and 33$^b$ of the bottom-board car drops which are so arranged as to permit said rails 33$^a$ and 33$^b$ to pivotally move on the pivotal points 34 into the position shown in dotted lines in Fig. 6 where said rails register with the lower bottom-board car return tracks 35$^a$ and 35$^b$ respectively, the track 35$^a$ being arranged under the track 21$^a$ and completing one of the bottom-board run-way loops while the track 35$^b$ is arranged under the track 21$^b$ and completes the companion run-way loop. The rails 33$^a$ and 33$^b$ are normally held in the horizontal position shown in full lines in Fig. 6 where they register with the rails of the tracks 21$^a$ and 21$^b$ as described.

Intermediate the two bottom-board car drops is arranged the shake-out 36 which is substantially of the same height as the tops of the bottom-board cars standing on the rails 33$^a$ and 33$^b$ when in their horizontal position. The shake-out comprises a platform constructed of spaced, longitudinally disposed bars.

Extending transversely across the shake-out and the two bottom-board car drops is an over-head track 37 upon which is mounted a wheeled carrier from which is suspended an air lift 38. This lift is provided with means for engaging a mold on one of the bottom-board cars. By means of said lift said mold may be raised and transported inwardly to the shake-out, turned one-quarter around if desired, and lowered upon said shake-out. The lift may then be connected to the cope and the same lifted from the drag, when the conditions will be appropriate for the shaking out of the castings.

Arranged underneath the rails of the shake-out are fingers 39 adapted to be projected upwardly between the bars of the shake-out by means of an air cylinder 40 or its equivalent, the said fingers being adapted to pass through the sand in the drag, to engage the casting and throw the same upwardly and out of the drag toward the rear end of the apparatus. The construction of this portion of the apparatus will be made more clear by reference to Fig. 12 where the fingers 39 are shown in their lower position in full lines and in their upwardly projected position in dotted lines. The casting will thus be thrown upon the inclined portion 41 of the shake-out down which it will slide to the lower horizontal portion 42 where it may be taken in charge by the chaplet chippers.

The sand loosened by the fingers 39 falls between the spaced bars of the shake-out and the sand from the cope is also shaken out and falls in a similar manner between the bars. The sand thus falling is deposited upon a constantly reciprocated riddle 43 from which point its subsequent movements will be hereinafter fully described.

As soon as the sand has been shaken from the cope and drag both of said parts may be lifted by the air lift 38 and again transported outwardly to the waiting bottom-board car on the bottom-board car drop. The empty flask having been deposited upon said car, the drop on which the said car stands is manually tripped so as to permit said car to descend by gravity onto the return track $35^a$ or $35^b$ as the case may be. As soon as the car has been passed onto the lower track the rails of the drop are returned to the horizontal position to await the next mold laden car from the cooling run-way.

It will be noted that the tracks $35^a$ and $35^b$ at first descend at a considerable angle, but the fall of said tracks becomes less as they near the back end of the cooling runway and the said tracks terminate at the bottom-board car lifts $19^a$ and $19^b$ which have been hereinbefore described. At the time when the returning bottom-board car reaches one of the lifts $19^a$ or $19^b$ the said lift should be in the lowered position so that the car may be readily raised to the upper level, where the said car may receive the parts of the flask and start upon its way over the pouring platform and cooling run-way, as above described.

It will be noted that at the front ends of the flask return belts $12^a$ and $12^b$ are the rollers $44^a$ and $44^b$ adjacent the lifts $19^a$ and $19^b$ and the rollers $45^a$ and $45^b$ are at the opposite ends of said belts. At the time when a returned bottom-board car with an empty flask thereon is on the rails $35^a$ and $35^b$ at the lifts $19^a$ or $19^b$, and just previous to the raising of such car by said lift, the empty flask thereon should be stripped from the bottom-board car and drawn onto the rollers $44^a$ and $44^b$ whence said flask may be moved onto the belt $12^a$ or $12^b$ for transportation to the back end of the molding table, where it will be rolled onto the rollers $45^a$ and $45^b$ to await the action of the air lift 13 in raising the two parts of the same and placing them upon the pattern cars. The stripping of said flasks from said bottom-board cars may be accomplished by hand if desired, although it is preferable to provide mechanical means for such action. The construction of such mechanical means is not herein claimed and will therefore not be described, there being various possible constructions well adapted to accomplish the result. The operation of the flask stripping means may be controlled either manually or automatically as desired, as will be readily understood by those skilled in the art.

It will be understood that as the castings roll or slide down the inclined portion 41 of the shake-out and onto the lower horizontal portion 42 considerable sand adhering to said castings will be loosened, which sand will fall between the bars of said portions 41 and 42. Beneath the shake-out is the sand pit 46 into which the sand from the portions 41 and 42 falls directly, the shake-out and its accompanying structures being supported on framework permitting the sand to fall without unnecessary obstruction. The sand deposited upon the riddle passes through said riddle and into the mixer 47 where it is properly tempered and mixed and spilled through the bottom opening 48 onto a continuously moving inclined conveyer 49 which conveyer spills the sand upon the reciprocating riddles 50 through which the sand falls to the continuously moving belt conveyer 51 extending longitudinally and substantially horizontally in the median line of the apparatus substantially to the point where the pattern car drop 5 is located where the conveyer 51 spills said sand upon the conveyer 52 which is located at a lower level than the conveyer 51 in order to carry the sand beneath the said pattern car drop and the molding table and pattern car loop to the sand pit 53 into which the said conveyer 52 discharges said sand and from which pit a continuously moving elevator 54 raises the sand and deposits it in a rotating hexagonal riddle 55 through which it passes onto the belt conveyer 56 which carries it to the molding sand hopper 16 as clearly illustrated in Fig. 4.

Extending frontwardly from the shake-out is longitudinally disposed a continuously moving belt conveyer 57 upon both sides of which are arranged a number of tumbling barrels $57^x$. Below the extreme forward end of the conveyer 57 is a casting chute 58. As the castings are taken from the portion 42 of the shake-out and the chaplets chipped from said castings they are placed in the said barrels $57^x$, from which they are taken after cleaning and placed upon the conveyer 57. This conveyer deposits said castings in the chute 58 which conveys them to the lower level where gate grinders at the point 59 grind the gates from the same and otherwise finish them if necessary.

The operation of the apparatus, in so far as not hereinbefore described, is as follows: Let it be assumed that a pattern car with a drag thereon is moving forwardly along the track 2 and has received the appropriate amount of sand, the proper ramming and necessary attention to prepare the drag portion of the mold. When said car reaches the pattern car drop 5 the lift 18 is operated to raise the drag from the car, roll it over, transport it to an empty bottom-board car awaiting on the track 20$^a$ above the lift 19$^1$ upon which bottom-board car said drag is deposited, the pattern car drop 5 being meanwhile operated to allow the empty pattern car to return on the track 7 underneath the molding table to the rear end of the pattern car loop. The second pattern car bearing a drag follows the first one and by means of the lift 18 is placed upon a waiting bottom-board car on the track 20$^b$, the pattern car drop again acting to return the empty pattern car by the track 7. The next pattern car will carry a cope and when said car arrives at the drop 5 the lift 18 will be used to lift said cope and place it upon the drag already upon the bottom-board car on the track 20$^a$. The bottom-board car on said track will then carry a completed mold and may be pushed onto the track 21$^a$ where it is taken up by the chain 29$^a$ and moved forwardly onto the pouring table as hereinbefore described. As soon as the track 20$^a$ has discharged its loaded car onto the track 21$^a$ a new empty bottom-board car is raised by the lift 19$^a$ from the track 35$^a$ and placed upon the track 20$^a$ to await the parts of another mold as previously. In the meantime the second cope has arrived upon its pattern car on the drop 5 and the lift 18 has been operated to convey said cope to the awaiting car on the track 20$^b$, thus completing the mold upon that car, whereupon said car may be moved forwardly onto the track 21$^b$ where it will be taken up by the intermittent chain in connection with said track and moved forwardly to the pouring table, the lift 19$^b$ being dropped to raise another empty bottom-board car from the track 35$^b$. In this way, two drags are followed by two copes in turn followed by two drags and two more copes, the awaiting cars on the tracks 20$^a$ and 20$^b$ being alternately supplied with drag and cope and pushed onto the tracks 21$^a$ and 21$^b$. As before described the cars on the tracks 21$^a$ and 21$^b$ are moved simultaneously so as to bring two new cars on each track under the top plates 27 simultaneously. In this way the work is greatly facilitated, the pouring simplified and a larger output made possible.

I claim:

1. A molding apparatus comprising a single pattern car loop longitudinally arranged, pattern cars adapted to travel over said pattern car loop, two bottom-board car loops longitudinally arranged, the front end of said pattern car loop adjacent the rear ends of said bottom-board car loops, bottom-board cars adapted to travel on said bottom-board car loops, and means for transferring parts of molds from the pattern cars on said pattern car loop to the bottom-board cars on the bottom-board car loops.

2. A molding apparatus comprising a single vertically disposed pattern car loop longitudinally arranged, pattern cars adapted to travel over said pattern car loop, two vertically disposed bottom-board car loops longitudinally arranged, the front end of said pattern car loop being adjacent the rear ends of said bottom-board car loops, bottom-board cars adapted to travel over said bottom-board car loops, and means for transferring parts of molds from the pattern cars on said pattern car loop to the bottom-board cars on the said two bottom-board car loops.

3. A molding apparatus comprising a single pattern car loop longitudinally arranged, pattern cars adapted to travel over said pattern car loop, two parallel bottom-board car loops longitudinally arranged, the front end of said pattern car loop being interposed between the rear ends of said bottom-board car loops, bottom-board cars adapted to travel over said bottom-board car loops, and means for transferring parts of molds from said pattern cars to said bottom-board cars.

4. A molding apparatus comprising a single pattern car loop longitudinally arranged, pattern cars adapted to travel over said pattern car loop, two parallel bottom-board car loops longitudinally arranged, the front end of said pattern car loop being interposed between the rear ends of said bottom-board car loops, bottom-board cars adapted to travel over said bottom-board car loops, and means at the said front end of said pattern car loop for transferring parts of molds from said pattern cars to said bottom-board cars.

5. A molding apparatus comprising a longitudinally extending pattern car loop, pattern cars carrying patterns, said cars adapted to travel along said pattern car loop, molding apparatus arranged along said loop and adapted to prepare parts of molds upon said pattern cars, two longitudinally disposed bottom-board car loops parallel with each other, bottom-board cars adapted to travel on said bottom-board car loops, the rear ends of said loops arranged adjacent the front end of said pattern car loop, means for transferring the parts of molds from said pattern cars at the forward end of said pattern car loop to the bottom-board cars at the rear ends of said bottom-board car loops, and pouring apparatus arranged along said bottom-board loops adjacent the rear ends thereof for pouring said molds.

6. A molding apparatus comprising a pattern car loop and a bottom-board car loop, portions of the said loops arranged adjacent each other, pattern cars bearing patterns and adapted to run over said pattern car loop, bottom-board cars adapted to run over said bottom-board car loop, parts of flasks, flask lifting means adapted to place said parts upon said pattern cars, molding means adapted to prepare molds in said flasks on said pattern cars, mold transferring means adapted to transfer said molds from said pattern cars to said bottom-board cars, and flask returning means adapted to return empty flasks from returned bottom-board cars on said bottom-board car loop to said flask lifting means.

7. A molding apparatus comprising a pattern car loop and a plurality of bottom-board car loops, portions of said bottom-board car loops arranged adjacent a portion of said pattern car loop, pattern cars bearing patterns on said pattern car loop, bottom-board cars on said bottom-board car loops, parts of flasks, flask lifting means adapted to place said parts upon said pattern cars, molding means adapted to prepare molds in said flasks while moving along said pattern car loop, mold transferring means adapted to transfer said molds from said pattern cars to the bottom-board cars on the various bottom-board car loops and flask returning means adapted to return empty flasks from returned bottom-board cars on each of said bottom-board car loops to said flask lifting means.

8. A molding apparatus comprising a single vertically disposed pattern car loop longitudinally arranged, pattern cars adapted to travel frontwardly over the upper side of said pattern car loop and backwardly over the under side of said pattern car loop, two vertically disposed bottom-board car loops longitudinally arranged, the front end of said pattern car loop being adjacent the rear ends of said bottom-board car loops, bottom-board cars adapted to travel frontwardly on the upper sides of said bottom-board car loops and backwardly on the under sides of said loops, and means for transferring parts of molds from the pattern cars on said pattern car loop to the bottom-board cars on the said bottom-board car loops.

9. A molding apparatus comprising a molding section, a pouring section, a cooling section and a shake-out section all arranged in a longitudinal series in the order mentioned, said molding section provided with a vertically disposed pattern car loop, pattern cars adapted to travel over said loop and means for preparing molds upon said pattern cars, a plurality of parallel, spaced run-ways extending from the forward end of said molding section through said pouring section, through said cooling section, and to said shake-out, return run-ways extending from said shake-out to the rear end of said run-ways, bottom-board cars adapted to run on said run-ways, means for transferring molds from the pattern cars to the bottom-board cars, said pouring section provided with top plates adapted to hold down the molds during the process of pouring and over-head means for carrying ladles of molten metal for pouring said molds, said cooling section provided with means for moving the poured molds therealong, and said shake-out section provided with means for shaking out the castings from said molds.

10. A molding apparatus comprising a single vertically disposed pattern car loop longitudinally arranged, pattern cars adapted to travel forwardly over the upper side of said loop and backwardly over the under side of said loop, means at the back end of said loop for lifting returned pattern cars to the upper side of said loop, means at the forward end of said loop for dropping pattern cars from the upper side of said loop to the lower side of said loop, molding apparatus arranged along the upper side of said loop for making molds upon said pattern cars, two bottom-board car loops longitudinally arranged and having their rear ends adjacent the forward end of said pattern car loop, bottom-board cars adapted to travel over said bottom-board car loops, suspended, transversely traveling, lifting means adapted to lift parts of molds from said pattern cars and transfer the same to said bottom-board cars, pouring apparatus for pouring said molds arranged along said bottom-board car loops and shake-out means for shaking out said molds at the forward end of said bottom-board car loops.

11. A molding apparatus comprising a molding section, means in said molding section adapted to prepare molds, two vertically disposed, parallel, longitudinally arranged bottom-board car loops, a shake-out section, said bottom-board car loops at their rear ends arranged adjacent said molding section and extending to said shake-out section at their forward ends, bottom-board cars adapted to travel forwardly over the upper sides of said bottom-board car loops and backwardly over the under sides of said bottom board car loops, bottom-board car lifts at the rear ends of said loops adapted to raise bottom-board cars from the lower sides of said loops to the upper sides thereof, bottom-board car drops at the forward ends of said loops adapted to drop bottom-board cars from the upper sides of said loops to the lower sides of said loops, suspended traveling lifting means adapted to transfer molds from the said molding section to the bottom-board cars on the upper sides of said loops at the rear ends thereof, means for pouring said molds arranged along the upper sides of said loops, means for transferring said poured molds from said bottom-board cars to said shake-out and means arranged intermediate the bottom-board car loops for returning the sand from said shake-out section to said molding section.

12. A molding apparatus comprising in combination pattern cars, bottom-board cars, a pattern car loop, said pattern cars adapted to travel over said pattern car loop, said pattern car loop provided with mold forming devices, a bottom-board car loop, said bottom-board cars adapted to travel over said bottom-board car loop and said loop provided with pouring devices, a cooling section and a shake-out; flasks, means for transferring molds from said pattern cars to said bottom-board cars and means for transferring said flasks from said bottom-board cars to said pattern cars, whereby said pattern cars travel over one loop, said bottom-board cars travel over another loop, and said flasks travel over a course equal to the combined length of both loops.

13. A molding apparatus comprising in combination a longitudinally disposed molding table, flask returning means arranged at the sides of said molding table, a plurality of mold conveying means longitudinally disposed extending from the front end of said molding table frontwardly, flask returning means arranged beneath said mold conveying means and sand returning means for returning sand from the front end of said mold conveying means to said molding table, said molding table provided with means adapted to prepare molds in parts of flasks, mold transferring means adapted to transfer molds from said molding table to said mold conveying means, a shake-out at the forward end of said mold conveying means adapted to shake-out castings from said molds and to direct the sand therefrom to said sand returning means, and means for placing the returned flasks upon said molding table.

14. In molding apparatus a run-way in the form of a vertically disposed, horizontally elongated loop, bottom-board cars mounted upon said loop and adapted to run frontwardly along the upper side and backwardly along the lower side of the same, a bottom-board car lift at the back end of said loop adapted to raise bottom-board cars from the lower side to the upper side of said loop and a bottom-board car drop at the front end of said loop adapted to drop bottom-board cars from the upper side of said loop to the lower side thereof.

15. In molding apparatus a run-way in the form of a vertically disposed, horizontally elongated loop, bottom-board cars mounted upon said loop and adapted to run frontwardly along the upper side and backwardly along the lower side of the same, pouring apparatus adapted to pour molds arranged adjacent the back end of the upper side of said loop, a shake-out arranged at the front end of said loop, a bottom-board car lift at the back end of said loop adapted to raise bottom-board cars from the lower side to the upper side of said loop and a bottom-board car drop at the front end of said loop adapted to drop bottom-board cars from the upper side of said loop to the lower side thereof.

16. In molding apparatus a run-way in the form of a vertically disposed horizontally elongated loop having upper and lower sides, the upper side inclined upwardly from the rear to the front end thereof, the lower side inclined downwardly from the front to the rear end thereof, bottom-board cars mounted upon said loop, means adapted to move said bottom-board cars up the inclined upper side of said loop to the front end thereof, said bottom-board cars adapted to run by gravity from the front end to the rear end of said lower side, a bottom-board car lift at the back end of said loop adapted to raise bottom-board cars from the lower side to the upper side of said loop and a bottom-board car drop at the front end of said loop adapted to drop bottom-board cars from the upper side of said loop to the lower side thereof.

17. In molding apparatus a run-way in the form of a vertically disposed, horizontally elongated loop having upper and lower sides, the front end of said loop arranged at a higher level than the rear end thereof, bottom-board cars mounted upon said loop, means adapted to move said bottom-board cars along the upper side of said loop from the back to the front end thereof, said bottom-board cars adapted to run by gravity from the front end to the rear end of said lower side, means at the back end of said loop adapted to raise bottom-board cars from the lower side to the upper side of said loop and a bottom-board car drop at the front end of said loop adapted to drop bottom-board cars from the upper side to the lower side of said loop.

18. In molding apparatus a run-way in the form of a vertically disposed, horizontally elongated loop, bottom-board cars mounted upon said loop and adapted to run frontwardly along the upper side and backwardly along the lower side of the same, a bottom-board car lift at the rear end of said loop adapted to raise bottom-board cars from the lower side to the upper side of said loop, a bottom-board car drop at the front end of said loop adapted to drop bottom-board cars from the upper side to the lower side of said loop, means for preparing molds and transferring same to said bottom-board cars, means located adjacent the rear end of said loop for pouring said molds, and means located adjacent the front end of said loop for shaking out said molds, said means comprising spaced bars, fingers arranged beneath said bars and adapted to be extended upwardly between the same and into engagement with a mold placed upon said bars, said fingers being adapted to throw the casting from said mold, and the said bars adapted to permit the sand from said mold to pass between them.

19. In molding apparatus two run-ways in the form of vertically disposed, horizontally elongated, parallel, spaced loops, bottom-board cars mounted upon said loops and adapted to run frontwardly along the upper side and backwardly along the lower side of the same, means at the front and rear ends of said loops for transferring said cars from the upper to the lower and from the lower to the upper sides of said loops respectively, molding apparatus adjacent the rear ends of said loops, means for transferring molds from said molding apparatus to said bottom-board cars at the rear ends of said loops, the upper sides of said loops passing over a pouring platform common to both loops and provided with means for pouring said molds, means for moving said cars along said run-ways to the front ends thereof, a shake-out arranged intermediate the said loops at the front ends thereof, means for transferring molds from the bottom-board cars at the front ends of said loops to said shake-out and for returning the flasks from said shake-out to said bottom-board cars and conveying means arranged intermediate said loops for conveying sand from said shake-out to the molding apparatus.

In testimony that I claim the above, I have hereunto subscribed my name in the presence of two witnesses.

IRA V. MACLEAN.

Witnesses:
WILLIAM H. MILLER,
JOHN H. SPONSELLER.